No. 802,858. PATENTED OCT. 24, 1905.
J. M. HARRIS.
ANIMAL TRAP.
APPLICATION FILED JUNE 2, 1904.
3 SHEETS—SHEET 1.
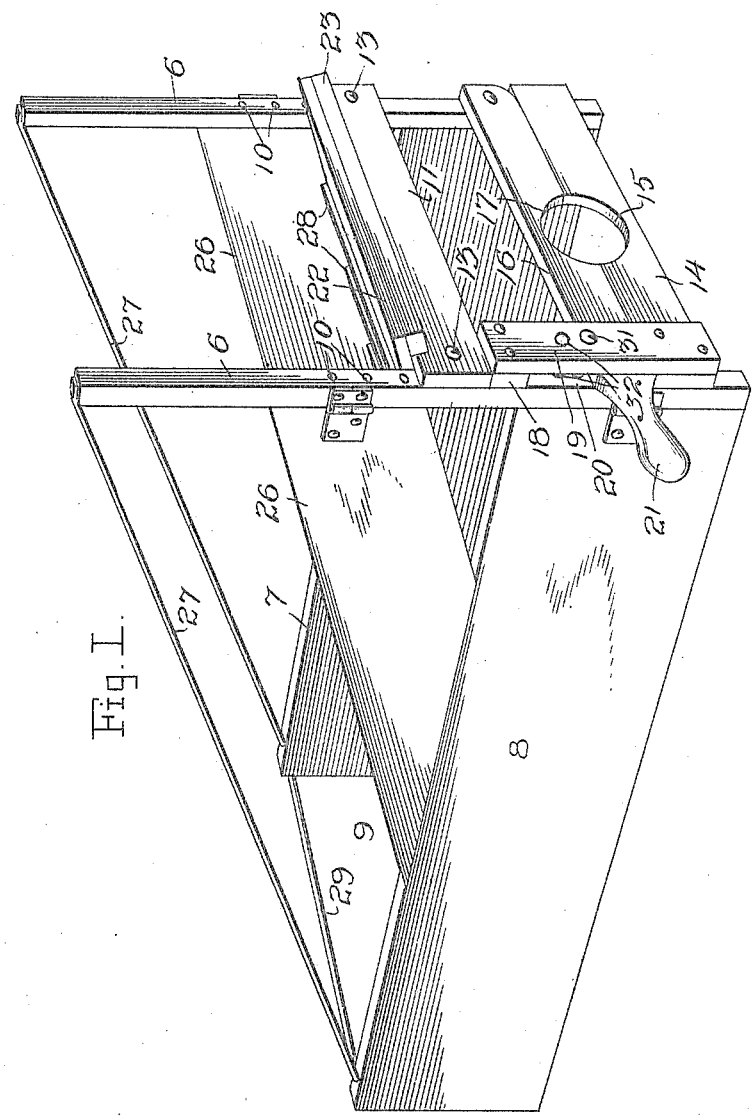
Fig. I.
Witnesses
C. K. Reichenbach.
W. Cos Keyes
Inventor
J. M. Harris.
by
Chandler & Chandler
Attorneys.

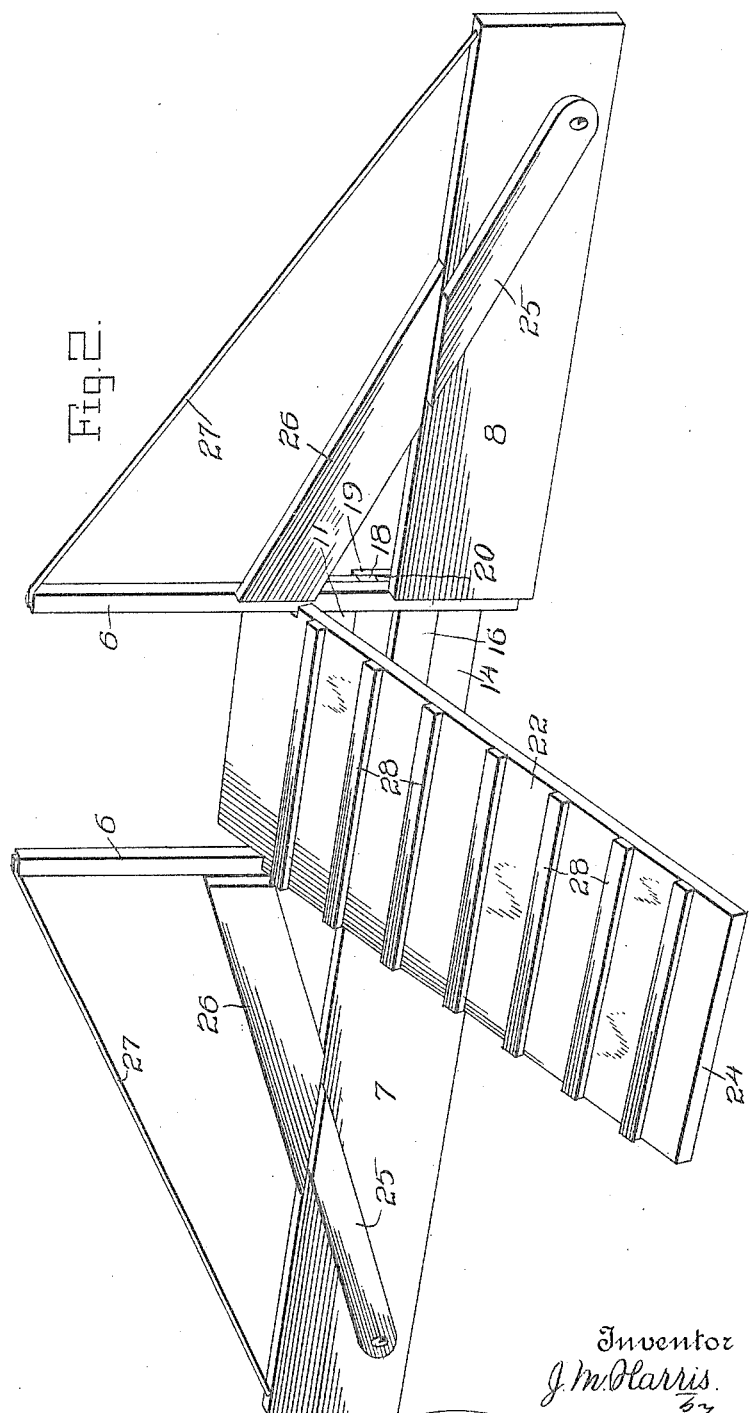

No. 802,858. PATENTED OCT. 24, 1905.
J. M. HARRIS.
ANIMAL TRAP.
APPLICATION FILED JUNE 2, 1904.
3 SHEETS—SHEET 3.
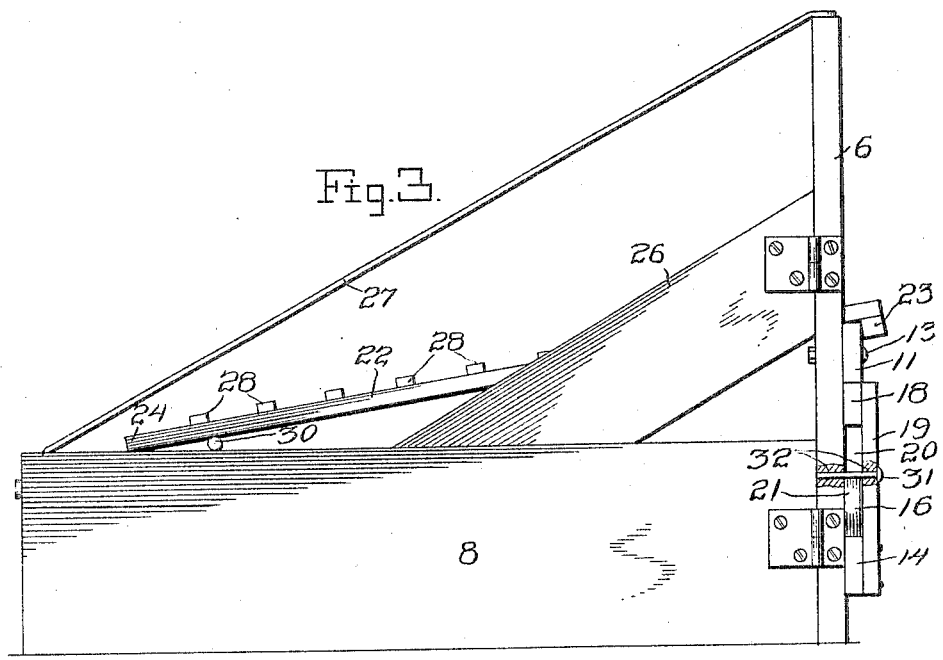
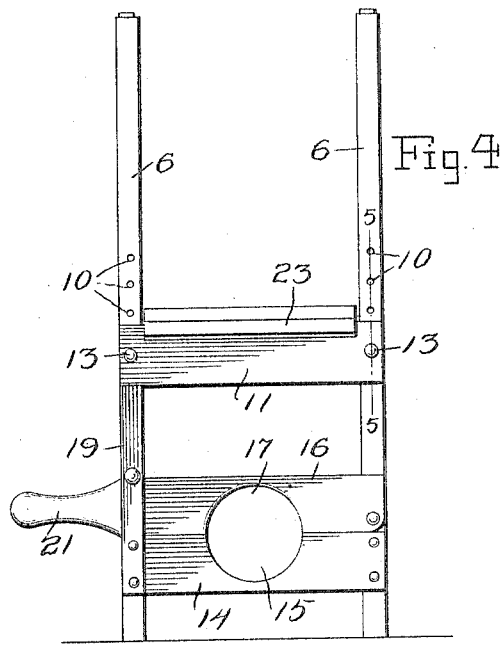
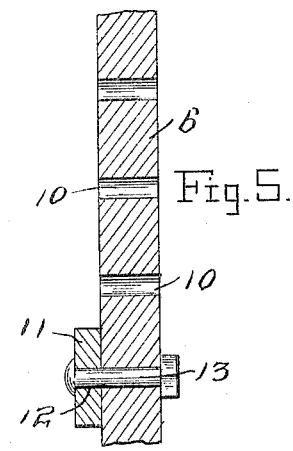
Witnesses
C. K. Reichenbach
W. C. O. Keyes
Inventor
J. M. Harris
by
Chandlee & Chandlee
Attorneys

UNITED STATES PATENT OFFICE.

JAMES M. HARRIS, OF DESOTO, MISSOURI, ASSIGNOR TO MYRON D. WEAVER, DESOTO, MISSOURI.

ANIMAL-TRAP.

No. 802,853.     Specification of Letters Patent.     Patented Oct. 24, 1905.

Application filed June 2, 1904. Serial No. 210,856.

*To all whom it may concern:*

Be it known that I, JAMES M. HARRIS, a citizen of the United States, residing at Desoto, in the county of Jefferson, State of Missouri, have invented certain new and useful Improvements in Animal-Traps; and I do hereby declare the following to be a full, clear, and exact description of the invention, such as will enable others skilled in the art to which it appertains to make and use the same.

This invention relates to combined animal traps and loaders, and has for its object to provide a device of this nature which may be used to confine animals during the process of ringing or branding and which may also be used for loading animals into cars or vehicles.

In the drawings forming a portion of the specification, and in which like numerals of reference indicate similar parts in the several views, Figure 1 is a perspective view of the device used as a loader. Fig. 2 is a view of the device when not in use. Fig. 3 is a side elevation of the device as it is arranged for the operation of ringing or branding. Fig. 4 is an end view. Fig. 5 is a section on line 5 5 of Fig. 4.

Referring now to the drawings, there is shown a pair of uprights 6, to the lower portion of which are hinged wings 7 and 8, which are movable to extend rearwardly from the uprights and parallel to each to form a passage 9, communicating with the space between the uprights, or to extend outwardly in opposite direction in the plane occupied by the uprights to form a portion of the fence of a barnyard or other inclosure, as shown in Fig. 2.

The uprights 6 are provided with a plurality of perforations 10, which are arranged in a line longitudinally thereof, and disposed against the forward faces of the uprights is a cross-piece 11, having perforations 12 in its ends, which are registered with a pair of the perforations 10, and engaged with the registering perforations are bolts 13. It is thus possible by engagement of the bolts with the different pairs of perforations 10 to shift the cross-piece 11 vertically. The lowermost perforations 10 are somewhat above the lower ends of the uprights 6, and secured at its ends to the uprights adjacent to their lower ends is a cross-piece 14, having an arc-shaped recess 15 in its upper edge, and pivoted to one of the uprights above the cross-piece 14 is a movable member 16, having an arc-shaped recess 17 in its lower edge, which lies above the recess 15, and the member 16 is movable upon its pivot to vary the distance between the bottoms of the recesses.

Secured at its lower end to one end of the member 14 and spaced at its upper end from the adjacent upright 6 by means of a block 18 is a slat 19, which extends above the member 14 to form a guideway 20 between it and the adjacent upright 6, and in this guideway is disposed the free end of the member 16, which extends beyond the slat and the upright and is provided with a handle 21.

A runway 22 is provided, and when the device is used as a stock-loader it is disposed with one of its ends upon the cross-piece 11 and is provided with a cleat 23, which projects downwardly and forwardly of the cross-piece to hold the runway in place. The runway 22 extends downwardly and rearwardly between the wings 7 and 8 and rests with its lower end 24 against the ground and lies with its side edges beneath cleats 25, which are secured to the inner faces of the wings 7 and 8. The upper end of the runway extends above the wings 7 and 8, and secured to these wings are diagonal members 26, which lie at the sides of the runway above the wings to form walls therefor and are hinged at their upper ends to the uprights 10.

Pivoted to the upper ends of the uprights 6 at one end and at the remaining ends to the wings 7 and 8 are supporting-rods 27, and the runway 22 is provided with transverse cleats 28 to facilitate the passage of the animals thereover.

In loading the animals into a vehicle or car the latter is brought into position at the upper end of the runway 22, and the runway is adjusted to bring its upper end into position to permit of the passage of the animals therefrom to the vehicle, after which the animals are driven up the runway into the vehicle or car. At their rearward ends the wings are provided with a detachable connecting member 29, by which they are held together.

When used for ringing or branding, the runway 22 is raised at its lower end and is supported by a bar 30, which rests upon the upper edges of the wings, and the animals are then driven into the passage between the wings and below the runway, the member 16 having been previously raised, and the head of one of the animals is caused to project through the recesses 15 and 17, after which the member 16 is lowered to confine the neck of the animal within the recesses, the members 16 being held in this position by means of a pin 31, which is engaged in a pair of alining perforations 32 in the slat 19 and the adjacent upright 6, the pin bearing against the upper edge of the member 16. The slat 19 and the upright 6 are provided with a plurality of these alining perforations 32, so that the member 16 may be held at different points. When the animal has been confined as described above, the operation of ringing or branding may be easily performed, after which the member 16 may be removed to release the animal.

When not in use, the wings 7 and 8 may be disconnected at their free ends and may be moved upon their hinges, as described above, to form a portion of a fence.

In practice modifications of the specific construction shown may be made, and any suitable materials and proportions may be used for the various parts without departing from the spirit of the invention.

What is claimed is—

1. An animal-trap comprising spaced uprights, wings hinged to one end of said uprights for movement to lie parallel to each other to form a passage therebetween or to extend in opposite directions, each of said wings having an upwardly-directed connection hingedly connected with the corresponding uprights, animal-confining mechanism connected to and disposed between the uprights and communicating with the passage between the wings, a cover removably disposed at one end between the uprights and supported therebetween, and above the animal-confining mechanism and disposed for movement of its other end into and out of engagement with the ground between the wings.

2. A portable animal-trap comprising spaced uprights, wings hinged to the uprights and lying normally parallel to each other to form a passage, a cross-piece secured at its ends to the uprights adjacent to their lower ends, said cross-piece having a recess in its upper edge, a slat secured at one end to one end of the cross-piece and extending thereabove and in spaced relation to the adjacent upright, a block secured between the slat and said upright, a member pivoted to the other upright at one end and lying with its remaining end within the space between the slat and the first-mentioned upright, said member having a recess in its lower end for coöperation with the recess of the cross-piece, said member being movable upon its pivot toward and away from the cross-piece, a second cross-piece secured at its ends to the uprights above the pivoted member, a top removably disposed at one end upon the second cross-piece, and a bar disposed upon the upper edges of the wings adjacent to their free ends, said bar receiving the top thereupon.

3. A portable animal-trap comprising spaced uprights, wings hinged at one end to the uprights for movement to lie parallel to each other to form a passage therebetween or to extend in opposite directions, animal-confining mechanism connected to and disposed between the uprights and communicating with the passage between the wings, a cover removably disposed at one end between the uprights and supported therebetween and above the animal-confining mechanism and disposed for movement of its other end into and out of engagement with the ground between the wings.

In testimony whereof I affix my signature in presence of two witnesses.

JAMES M. HARRIS.

Witnesses:
F. H. BLACKMAN,
M. D. VOSBURG.